United States Patent [19]
Fujii et al.

[11] Patent Number: 5,313,836
[45] Date of Patent: May 24, 1994

[54] SEMICONDUCTOR SENSOR FOR ACCELEROMETER

[75] Inventors: Tetsuo Fujii, Toyohashi; Susumu Kuroyanagi, Anjo; Yoshitaka Gotoh, Ichinomiya, all of Japan

[73] Assignee: Nippondenso Co., Ltd., Kariya, Japan

[21] Appl. No.: 996,474

[22] Filed: Dec. 23, 1992

Related U.S. Application Data

[63] Continuation of Ser. No. 553,090, Jul. 17, 1990, abandoned.

[30] Foreign Application Priority Data

Jul. 17, 1989 [JP] Japan ................ 1-184331

[51] Int. Cl.⁵ .................................. G01P 15/08
[52] U.S. Cl. .................................. 73/517 R; 73/514
[58] Field of Search ............ 73/517 R, 514, 517 AV; 338/5, 46

[56] References Cited

U.S. PATENT DOCUMENTS 4,882,933 11/1989 Petersen et al. ............ 73/517 R
4,955,234 9/1990 Marek ............ 73/517 R

FOREIGN PATENT DOCUMENTS 49-132989 12/1974 Japan .
60-138977 6/1985 Japan .
64-16966 1/1989 Japan .
1-14711 3/1989 Japan .
1-240865 9/1989 Japan .

OTHER PUBLICATIONS

Proceedings of the Second International Forum on ASIC and Transducer Technology (ASICT '89) Apr. 9-12, 1989, Mallon et al., "Silicon Sensors and Microstructures: Technology of Today," pp. 87-92.

*Primary Examiner*—John E. Chapman
*Attorney, Agent, or Firm*—Cushman, Darby & Cushman

[57] ABSTRACT

A semiconductor sensor for an accelerometer including a beam portion, consisting of a thin beam portion and a thick beam portion and supported by a solid member through the end of the thin beam portion, and a stopper portion provided at a position on an imaginary line along which a center of gravity of the thick beam portion moves. These components are integrally formed in a silicon substrate. Excessive displacement of the beam portion when excessive acceleration is applied is effectively suppressed by the stopper portion, and breakage of the thin beam portion due to excessive acceleration can be avoided.

15 Claims, 12 Drawing Sheets

SEMICONDUCTOR SENSOR FOR ACCELEROMETER

This is a continuation of application Ser. No. 07/553,090, filed on Jul. 17, 1990, which was abandoned upon the filing hereof.

BACKGROUND OF THE INVENTION

1. Field of the Invention

The present invention relates to a semiconductor sensor for an accelerometer and to a method for making the same.

2. Description of the Related Art

A semiconductor sensor for an accelerometer is known having a thin beam portion on which is mounted a strain sensing device. This detects acceleration with a high sensitivity.

When a high sensitivity is attained in this way and excessive acceleration is applied, however, this beam portion may sometimes be broken due to the force applied to it.

To avoid this problem, as shown in FIG. 1, there has been provided another semiconductor sensor in which a stopper 1 is provided to restrict the amount of displacement of the beam portion 1 when it receives an accelerating force.

In FIG. 1, B denotes a beam portion consisting of a thin beam portion 3 and a thick beam portion 2.

In this construction, when the thick beam portion 2 is displaced, for example, in an upper direction due to acceleration, the thin beam portion 3, which supports the thick beam portion 2 is deformed by the stress applied thereto in response to the displacement.

A piezo resistance device 6 is provided on the thin beam portion 3 as a stress sensing device and thus the amount of the acceleration applied to the sensor can be detected by the change of the resistance value generated in response to the deformation of the thin beam portion 3.

Also, when the above sensor receives excessive acceleration causing the thick beam portion 2 to be deformed by a great amount, the displacement thereof is stopped by a stopper 1.

In the construction of the known semiconductor sensor for an accelerometer mentioned above, however, when the thin beam portion 3 is formed extremely thin in order to detect acceleration with a high sensitivity and when the sensor receives excessive acceleration, the thick beam portion 3 is displaced upwardly to contact the stopper 1, whereby the movement of the thick beam portion 2 is stopped by the stopper contacting the edge of the thick beam portion 2.

In this situation, since the contacting portion between the stopper 1, provided near one of the edges of the thick beam portion 2, and the edge of the thick beam portion 2 serves as a fulcrum, an inertial moment defined by the distance between the fulcrum and a center of gravity of the thick beam portion 2 and a weight thereof, acts on the thick beam portion 2 and thus it tends to continue moving utilizing the center of gravity as a dynamic point and also tends to displace around the fulcrum point.

Accordingly, the opposite end of the thick beam portion 2 of the beam portion B, i.e., the thin beam portion 3, becomes the working point and thereby the thick beam portion 2 is displaced upward causing a strong stress on the thin beam portion. Eventually, the thin portion of the thin beam portion 2 may be broken.

SUMMARY OF THE INVENTION

The present invention is as made to overcome these problems in the related art.

The object of the invention is to provide a semiconductor sensor for an accelerometer by which displacement of the beam portion can be reliably suppressed, even when excessive acceleration is applied.

To attain the object, according to one aspect of the present invention, there is provided a semiconductor sensor for an accelerometer, including a solid member; a beam portion, formed by a thin beam portion and a thick beam portion connected to each other and supported on the solid member by at least one end of the thin beam portion, the thin beam portion serving as a stress generating region and connected at one end portion to the solid member, the thick beam portion extending from another end of the thin beam portion, serving as a load receiving region, and provided with at least one attenuated portion on at least one main surface thereof to be made partially thin; a semiconductor strain sensing device formed on the thin beam portion and detecting a strain value generated in the thin beam portion in response to acceleration applied to the thick beam portion; and at least one stopper provided on the same plane as the thin beam portion but separately from the thin beam portion to restrict a range of displacement of the thick beam portion. The portion which the stopper contacts is a surface on which a groove is provided.

According to another aspect of the invention, there is provided a method for making a semiconductor sensor for an accelerometer including a first step for forming on a surface of a first semiconductor substrate an embedded layer filled with a filling material; a second step for bonding a second semiconductor substrate to a surface of the first semiconductor substrate to seal the embedded layer and to form a bonded semiconductor substrate; a third step for attenuating a thickness of the second semiconductor substrate and thereafter for forming a first semiconductor strain sensing device on the second semiconductor substrate; a fourth step for etching a predetermined portion of the second semiconductor substrate until reaching the surface of the embedded layer, for selectively removing the filling material in the embedded layer to form a space therein, and for forming a stopper having the same component as the second semiconductor substrate above the space, a fifth step for etching a predetermined portion of the second semiconductor substrate until reaching a portion inside of the first semiconductor substrate to form an upper side separating groove, and a sixth step for etching a predetermined portion of the first semiconductor substrate to form a thin beam portion including the first semiconductor strain sensing device and to form a lower side separating groove communicated to the upper side separating groove in the first semiconductor substrate, ultimately forming a beam portion consisting of a thin beam portion and a thick beam portion extended from the thin beam portion, a center of gravity thereof being below the stopper inside the bonded substrate.

In accordance with the semiconductor sensor for an accelerometer of the present invention, when acceleration is applied to the sensor, the strain value of the thin beam portion corresponding to the acceleration applied to the thick beam portion can be detected by the semiconductor strain sensing device, whereby the actual value of the acceleration applied to the sensor can be detected.

When excessive acceleration is applied, the contacting portion provided on the surface of the area of the attenuated portion in the thick beam portion contacts the stopper provided on the same plane as the thin beam portion, so the movement of the beam portion can effectively be stopped and thus the range of the displacement of the beam portion can be restricted.

Since one of characterizing features of the present invention is that the contacting portion of the thick beam portion and the stopper portion can be provided at a point closer to a center of gravity of thick beam portion, the stopper can act on the dynamic point such as the center of gravity of the thick beam portion to effectively stop the movement of the beam portion. Further, while the contacting portion can easily be arranged on any point on an imaginary line along which the center of gravity of thick beam portion moves when the thick beam portion is displaced.

Therefore, when inertial moment is generated, with the contacting portion of the stopper and thick beam portion as a fulcrum in the beam portion at the time when the beam displacement is restricted, the adverse effect of the moment affecting the thin beam portion can be remarkably reduced.

Thus, when excessive acceleration is applied to the sensor, a superior effect can be obtained that the displacement of the beam portion can be effectively and accurately suppressed by the stopper.

Further, the method for making the semiconductor sensor enables a easy production of a semiconductor sensor having the aforementioned advantages.

In the present invention, since the step in which the beam portion is separated from the substrate is carried out after the step for forming the stopper, when some vibration is applied to the sensor in the processing step, breakage of the beam portion caused by the vibration can be avoided.

DESCRIPTION OF THE PREFERRED EMBODIMENTS

Preferred embodiments of the present invention will be explained with reference to attached drawings hereunder.

EXAMPLE 1

Figure 1:
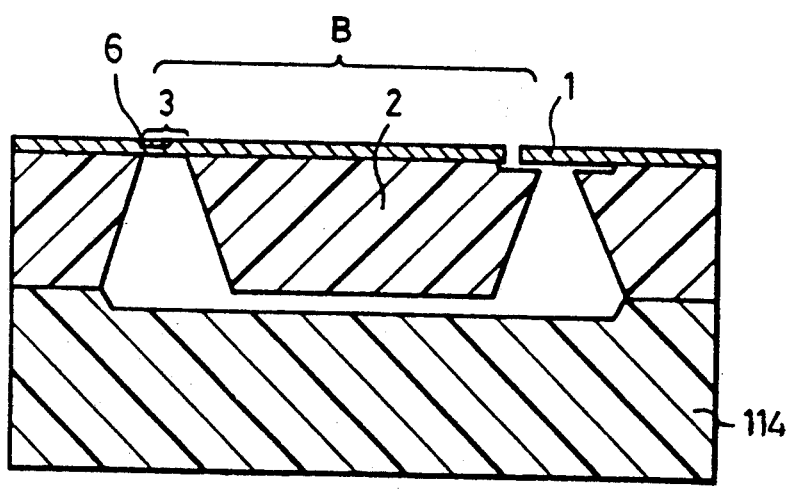
FIG. 1 is a cross-sectional view of a conventional semiconductor sensor for an accelerometer.
Figure 2A:
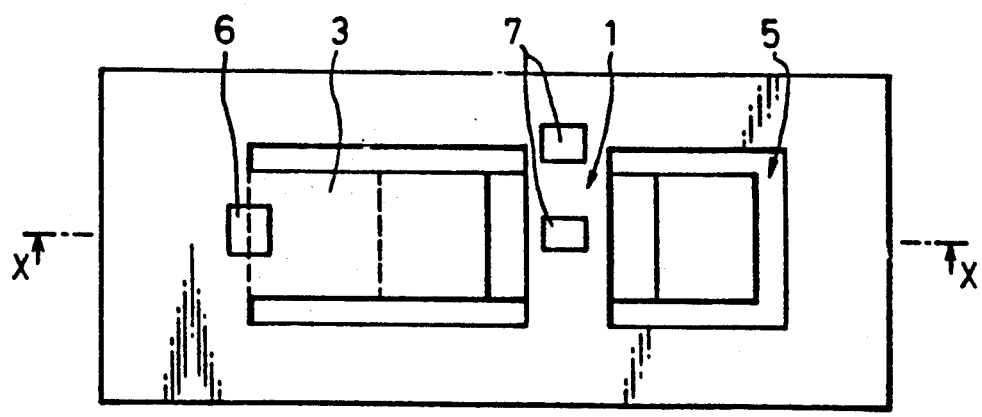
FIG. 2A is a plane view of one embodiment of a semiconductor sensor for an accelerometer of the present invention.
Figure 2B:
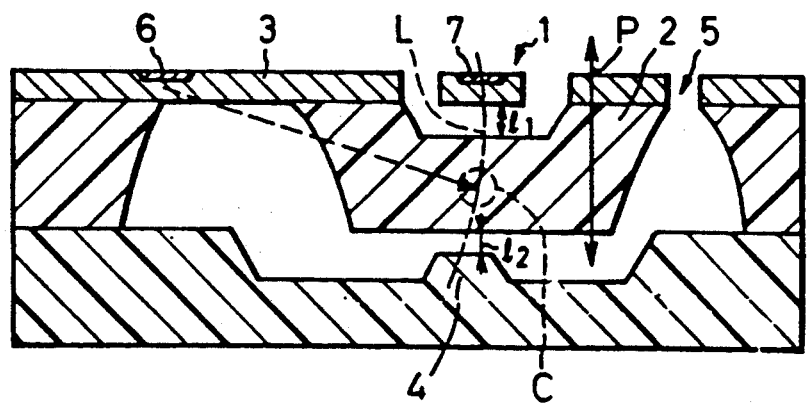
FIG. 2B is a cross sectional view of the sensor shown in FIG. 2A taken along the line X—X.
Figure 2C:
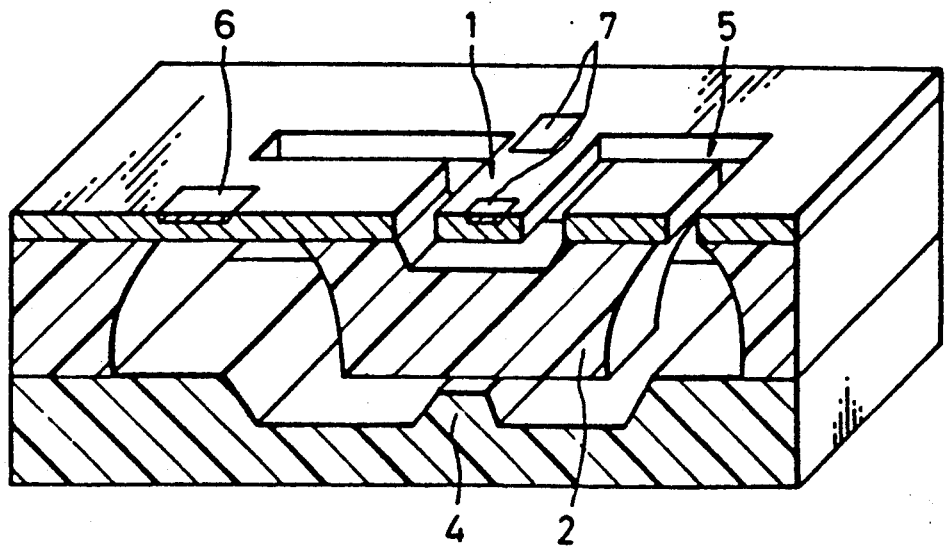
FIG. 2C is a perspective view of the sensor shown in FIG. 2A.

FIGS. 2A to 2C show the construction of one embodiment of a semiconductor sensor for an accelerometer in the present invention, wherein FIG. 2A is a plane view thereof, FIG. 2B is a cross-sectional view thereof taken along line X—X, and FIG. 2C is a perspective view thereof.

In these figures, 1 denotes an upper side stopper to stop upward movement of a thick beam portion 2, and 3 denotes a thin beam portion.

Reference numeral 4 denotes a lower side stopper to stop downward movement of a thick beam portion 2, 5 denotes a slit, while 6 and 7 denote piezo resistance devices serving as strain sensing devices.

C denotes a center of gravity of the thick beam portion, and $l_1$ and $l_2$ denote a distance of a gap between an upper surface of the thick beam portion and the upper side stopper and between a lower surface thereof and the lower side stopper, respectively.

In this construction, the amount of displacement of the thick beam portion is restricted by the gap distance $l_1$ and $l_2$.

In this embodiment, the semiconductor sensor has a cantilever type configuration, so it can be displaced upwardly or downwardly as shown by an arrow P in FIG. 2 when the thick beam portion 2 receives acceleration.

In this construction, the piezo resistance device 6 formed on a root portion of the thin beam portion 3 receives a stress corresponding to the displacement of the thin beam portion 3, and the resistance value generated therefrom varies in accordance with the value of the stress.

Note that the acceleration applied to the thick beam portion 2 can be detected by the change of the resistance of the piezo resistance device 6.

On the other hand, in this embodiment, both of the upper side stopper 1 and the lower side stopper 4 are arranged on an imaginary extended line L along which the center of gravity C of the thick beam portion 2 moves (as shown by a dotted line in FIG. 2B), so when the sensor receives excessive acceleration, the displacement of the thick beam portion 2 due to acceleration is suppressed around the center of gravity.

Accordingly, breakage of the thin beam portion which has often occurred in a conventional sensor can be avoided.

In this embodiment, the upper side stopper 1 may be arranged so that it substantially exists on the imaginary extended line L along which the center of gravity C of the thick beam portion 2 moves with some extent of allowance.

Further, in this embodiment, another piezo resistance device 7 may be provided on the upper side stopper 1.

In this embodiment, when the thick beam portion 2 contacts the upper side stopper 1 due to receiving excessive acceleration, the thick beam portion 2 acts to strain the upper side stopper. The amount of the strain can be detected by the change of the resistance value of the piezo resistance device 7 which is provided on the upper side stopper 1.

Note that the absolute value of acceleration applied to the thick beam portion 2 can be detected by the piezo resistance device provided on the upper side stopper 1, and further breakage of the upper side stopper 1 can also be watched for.

In a conventional sensor, detection of an absolute value of excessive acceleration applied to a sensor requires another acceleration sensor having a different sensing area, i.e., its area has a different resonant frequency for detecting acceleration, separate from an ordinary sensor having a high sensitivity for detecting a small amount of the acceleration, forming a group of sensors.

However, in the present embodiment, since the absolute value of the excessive acceleration can be detected by arranging the piezo resistance device 7 on the upper side stopper 1, another acceleration sensor is not required.

This contributes to make the overall size of the accelerometer smaller.

Moreover, in this embodiment, the upper side stopper 1 is arranged in such a way that it can stop the displacement of the thick beam portion 2 at the portion in the vicinity of the center of gravity thereof, so the value of the strain applied to the upper side stopper 1 by the thick beam portion 2, which corresponds to the absolute value of the excessive acceleration applied to the thick beam portion 2, can be accurately detected.

Hereafter, one embodiment of a method for producing a semiconductor sensor for detecting acceleration of the present invention will be explained with reference to FIGS. 3A to 3J.

First, a $SiO_2$ film 102 is formed on a surface of an N-type Si substrate 101 having a (100) phase direction and a resistivity of 5 to 20 $\Omega \cdot cm$.

Predetermined patterns are etched on the $SiO_2$ film 102 utilizing a conventional photoetching method.

After that, a grooved portion 103 having a predetermined depth $l_1$, for example, 5 to 50 $\mu m$, is formed inside the Si substrate 101 utilizing the patterned $SiO_2$ film 102 as a mask.

Thereafter, the $SiO_2$ film 102 is removed, another $SiO_2$ film 104 is formed. Then, a polycrystalline silicon layer (referred to as a poly Si layer hereunder) 105 is deposited by a vacuum CVD method as shown in FIG. 3B.

The surface of the substrate is ground to make it smooth and leaving only the poly Si layer 105 in the grooved portion 103.

On the other hand, an N-type Si layer 107 having a (100) phase direction and a resistivity of 5 to 20 $\Omega \cdot cm$ is formed on a surface of a P-type Si substrate 106 having (100) phase direction and a resistivity of 5 to 20 $\Omega \cdot cm$ by the epitaxial growth method.

If necessary, the surface of the N-type Si layer 107 may be treated by a mirror polishing method to make the surface thereof smoother.

After that, a $SiO_2$ film 108 is formed on the surface of the Si layer 107 by a thermal oxidizing method.

Figure 3A:
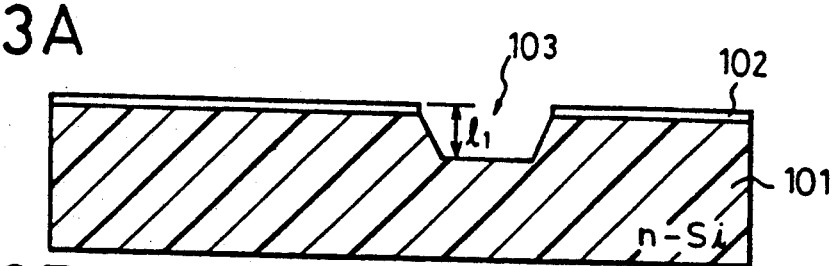
FIGS. 3A to 3J are cross-sectional views of the sensor at steps in the production process.
Figure 3B:
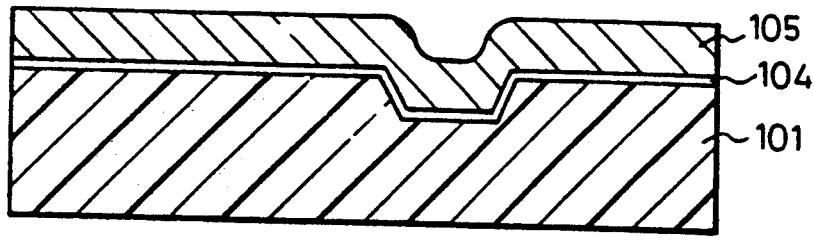
Figure 3C:
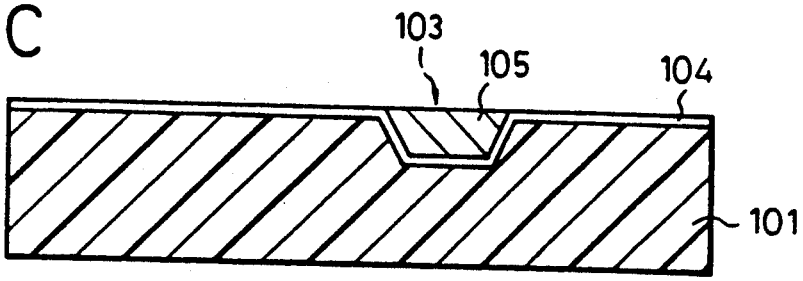
Figure 3D:
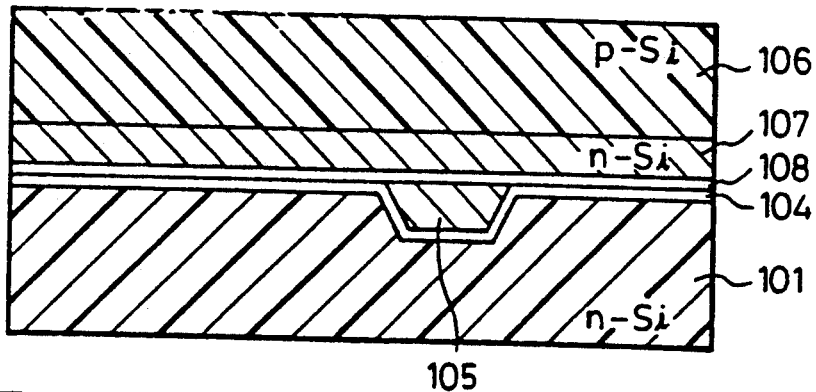

Thereafter, the substrates 101 and 106 are bonded by a wafer direct bonding method by bringing the $SiO_2$ films 104 and 108 in contact with each other, as shown in FIG. 3D.

In this embodiment, the substrates 101 and 106 may be bonded to each other utilizing a melt bonding method by forming, for example, a BPSG film on the surface of the substrate 106 instead of forming the $SiO_2$ film 108 thereon.

Figure 3E:
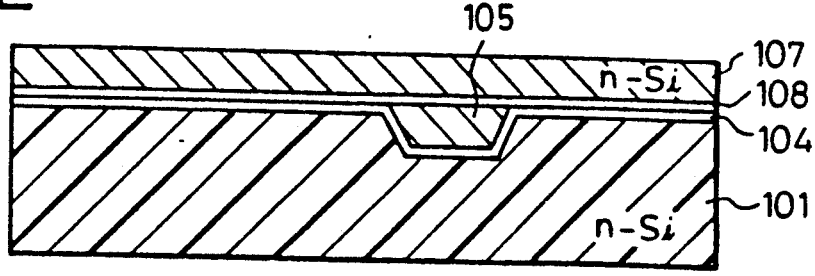

Then, the P-type Si substrate 106 is removed by an electrolytic etching method as shown in FIG. 3E.

Figure 3F:
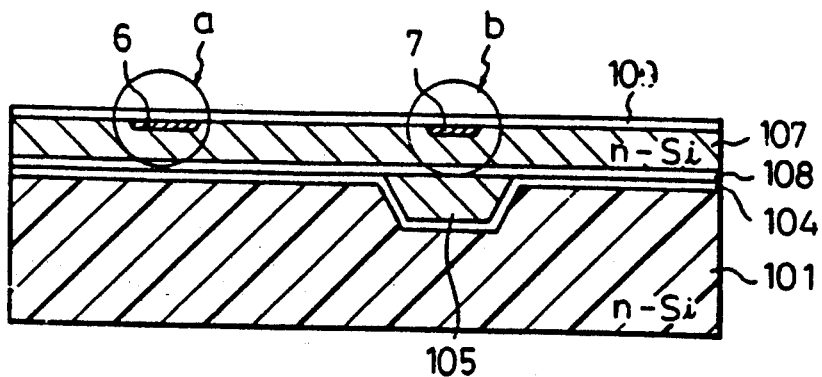

Thereafter, a $SiO_2$ film 109 is formed on the surface of the Si layer 107 and boron ions are injected into predetermined regions, for example, portions a and b as shown in FIG. 3F, to form P-type piezo resistance devices 6 and 7.

Note that a thin beam portion and an upper side stopper portion are formed on the portion a and portion b respectively, later.

Successively, a CMOS device circuit, wiring layer, or the like are formed on predetermined portions utilizing ordinary IC making methods (not shown).

Note that in addition to forming the CMOS device circuit therein, an embedded layer and an epitaxial layer may be formed to make a bipolar IC or the like.

Figure 3G:
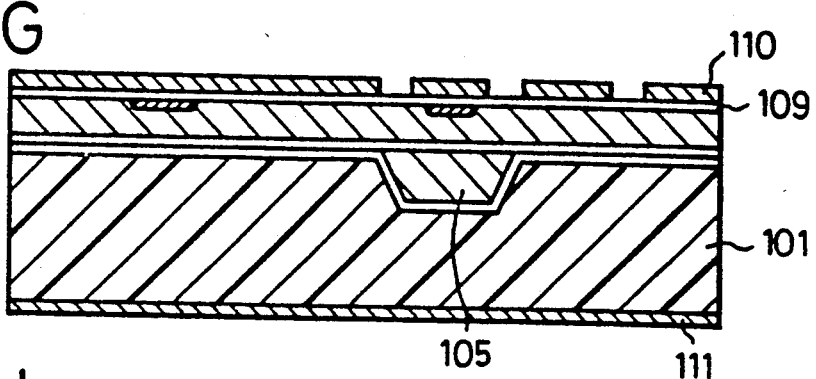

Then, a P-type silicon nitride film (referred to as a P-SiN film) 110 having a predetermined pattern is formed on the $SiO_2$ film 109, while a chromium (Cr) deposition film 111 having a thickness of 0.1 to 2 $\mu m$ is formed on a back surface of the substrate 101, as shown in FIG. 3G.

After that, the $SiO_2$ film 109 is partially removed utilizing the P-SiN film 110 as a mask, and successively the N-type Si layer 107 is etched utilizing an anisotropic etchant composed of an alkaline etching substance such as KOH.

Figure 3H:
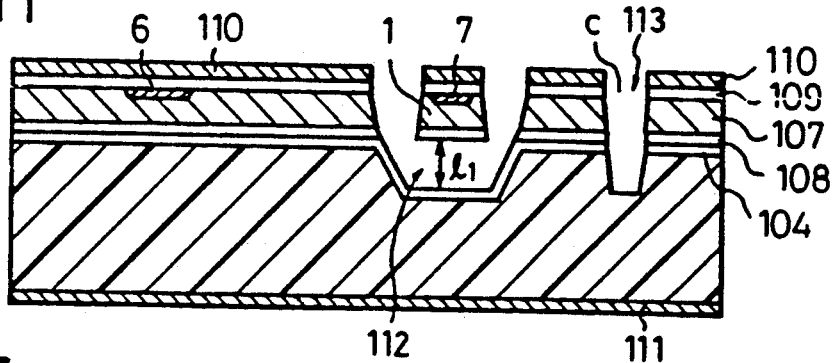

Further, after etching the $SiO_2$ films 108 and 104, the poly Si layer 105 formed in the grooved portion 103 is removed by alkaline etching method again to form a space 112 inside the substrate as shown in FIG. 3H.

At this time, the upper side stopper portion 1 is formed above the space 112. The gap length $l_1$ can be determined by the thickness of the poly Si layer 105.

In this situation, since the poly-Si layer 105 is polycrystalline, the etching operation proceeds isotropically, so the space 112 can be easily formed.

On the other hand, a grooved portion 113 is simultaneously formed at the portion C of the substrate 101.

Figure 3I:
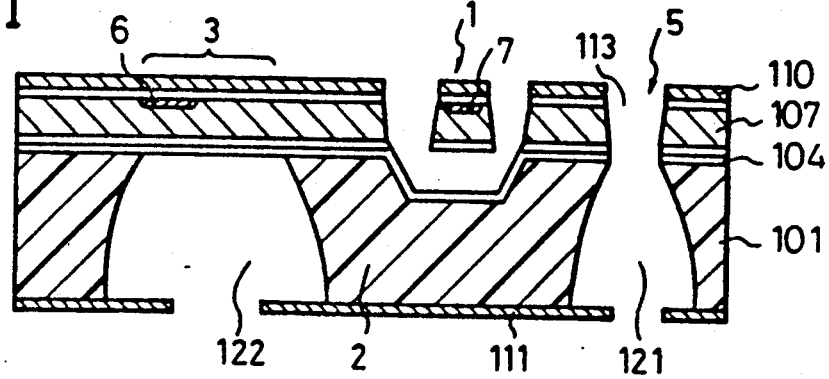

Then, the Cr deposition film 111 formed on the back surface of the substrate 101 is etched to have a predetermined pattern, then the surface thereof is covered with a wax or the like (not shown). After that, the substrate 101 is etched by an isotropic etchant such as fluoric nitride acetic acid until reaching the $SiO_2$ film 104 as shown in FIG. 3I, to form a slit portion 121 and a grooved portions 122 in the substrate 101, respectively.

At this time, when a suitable etchant is selected, the etching operation can be stopped before the $SiO_2$ film 104 is etched.

Thus, the thick beam portion 2 and the thin beam portion 3 of the acceleration sensor of the present invention are formed as shown in FIG. 2, while the slit 113 formed inside the substrate 101 from the top surface thereof and the slit portion 121 formed inside the substrate 101 from the bottom surface thereof are communicated each other to make a slit 5 through the substrate 101, by the etching operation as shown in FIG. 3H.

The slit 5 may be formed as three sides of rectangle, for example, a configuration in the shape having three free rectangular sides, and a remaining side fixed to a main portion of the substrate layer, in the substrate 101 to make a cantilever beam type detecting portion of an acceleration sensor as shown in FIGS. 2A and 2C.

After that, the Cr deposition film 111 is removed by an etching operation.

Figure 3J:
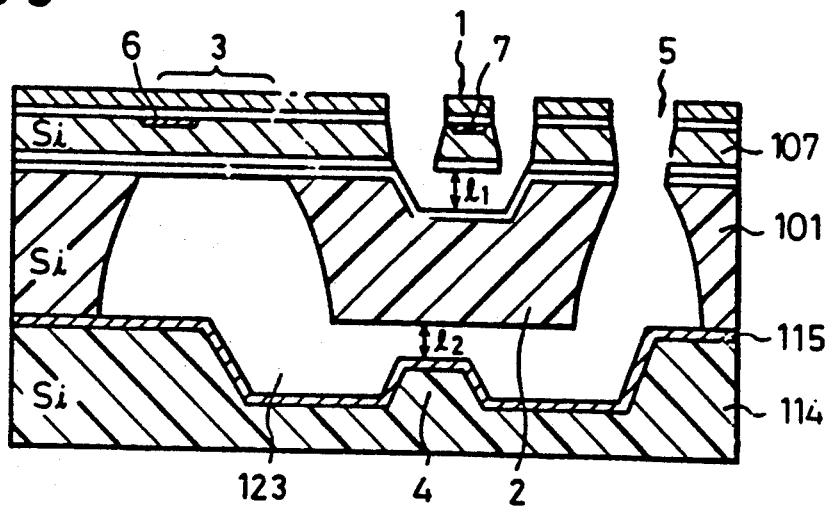

Then, a cavity portion 123 with at least one projecting portion 4 provided inside is formed on one surface of a Si substrate 114 having a (100) phase direction and the height of the projecting portion 4 is determined so as to adjust the distance $l_2$ between the top edge of the projecting portion 4 and a bottom surface of the thick beam portion 2 as shown in FIG. 3J.

After forming a Pyrex glass layer 115 having a thickness of 0.5 to 10 μm on the surface of the Si substrate 114 by a sputtering deposition method, the substrates 101 and 104 are bonded to each other with the Pyrex glass layer 115 interposed therebetween at a temperature of 360° to 400° C. utilizing a conventional anodic bonding method to integrally form the semiconductor sensor for an accelerometer of the present invention by silicon as shown in FIGS. 2 and 3J.

According to this producing method, since the IC circuit portions are formed in the process step as shown in FIG. 3F and in this step, there is no grooved portion or no space on the wafer in which contaminated particles, dust, chemical substances, etc are easily deposited, an acceleration sensor having a superior working stability and reliability can be produced.

Since the gap distance $l_1$ and $l_2$ which restrict the amount of the displacement of the thick beam portion 2 shown in FIG. 2B are determined by the thickness of the Si layer or thickness of a gap formed at the time when the substrates are bonded to each other, the gap distances $l_1$ and $l_2$ can be set and formed freely and accurately.

Further, in this method, since the time when the beam portion consisting of the thick beam portion 2 and the thin beam portion 3 is formed in the substrate 101 as shown in FIG. 3I is in each of the steps after the step in which the stopper portion 1 is formed as shown in FIG. 3H, vibration or fluctuation applied to the beam portion in these production process can be absorbed by the stopper portions, thereby breakage of the stopper portions can be avoided in these production process.

Further, the positions of the stopper portion 1 and the beam portion B can be determined by the etching operation for the N-type Si layer 107 in the step as shown in FIG. 3H, so the control of the accuracy of the relative positional relationship between the two portions becomes easy.

Moreover, in the step as shown in FIG. 3J, the contacting surface of the thick beam portion 2 to the upper stopper portion 1 and/or the lower stopper portion 4 may be made round or tapered to provide a uniform contact between the stopper portion and the contacting portion of the thick beam portion 2.

Figure 4:
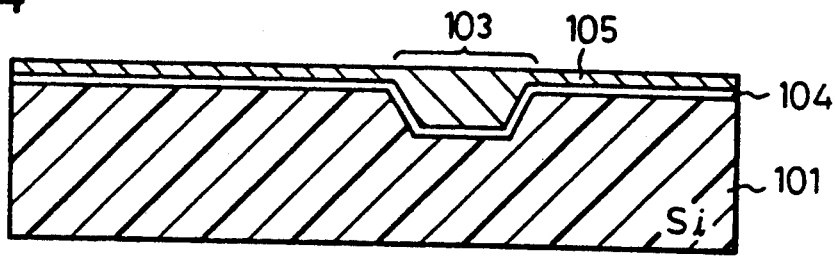
FIG. 4 indicates embodiment of a polycrystalline silicon layer.

In this method for producing an acceleration sensor, after the poly Si layer 105 is deposited on the surface of the substrate 101 as shown in FIG. 3B, the poly-Si layer is left only in the grooved portion 103 by grinding and smoothing the poly Si layer 105 up to the surface of the SiO$_2$ film 104 as shown in FIG. 3C, although the poly-Si layer 105 may be left on the entire surface of the substrate 101 by grinding and smoothing it to give a thickness of about 0.5 to 2 μm as shown in FIG. 4. After that, the same process steps as mentioned above may be carried out on thus treated substrate.

Figure 5A:
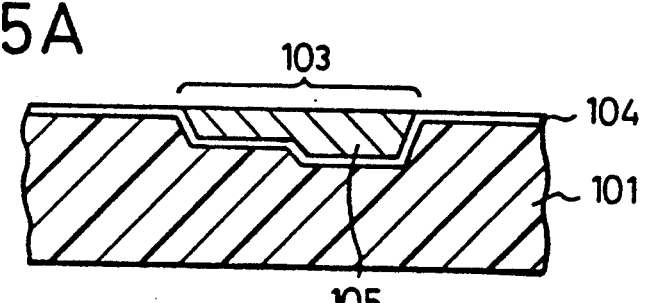
FIGS. 5A and 5B are cross-sectional views of configurations of a grooved portion.
Figure 5B:
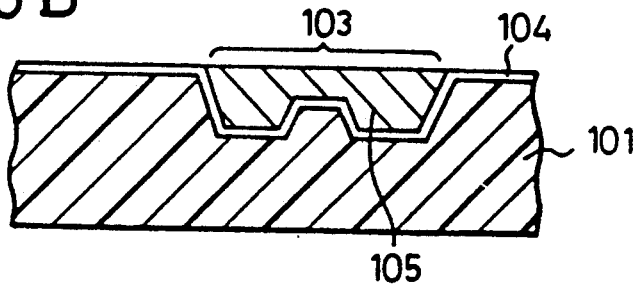

Moreover, as shown in FIGS. 5A and 5B, the configuration of the grooved portion 103 in which the poly Si layer 105 is left can be freely designed in response to the beam configuration of the acceleration sensor.

Figure 6:
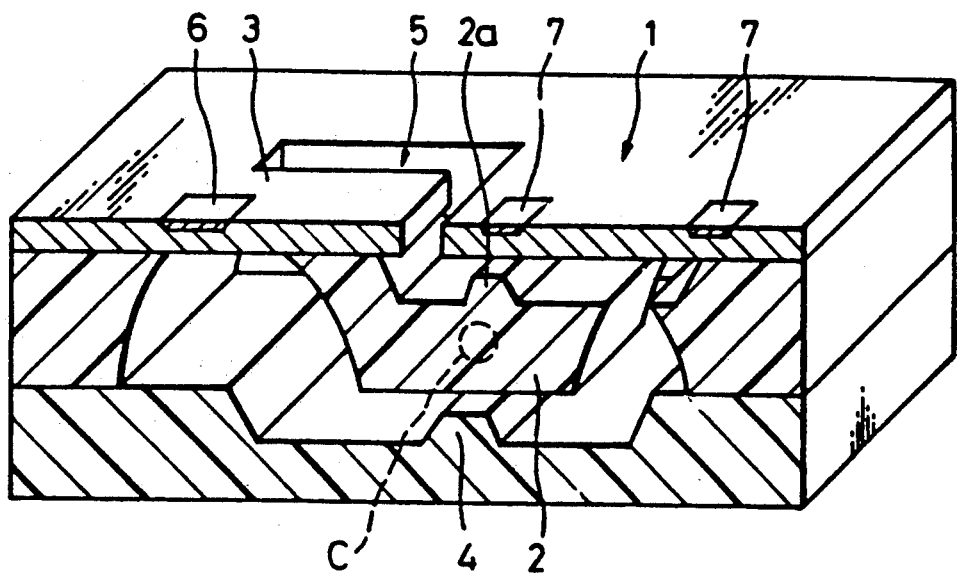
FIG. 6 is a perspective view of an embodiment of the present invention produced utilizing the construction shown in FIG. 5B.

A semiconductor sensor for an accelerometer as shown in FIG. 6 can be produced utilizing a grooved portion designed as shown in FIG. 5B.

In FIG. 6, the same elements as in the acceleration sensor as shown in FIG. 2 are given the same reference symbol.

Further, in FIG. 6, 2a denotes a projecting portion provided on a surface of the thick beam portion 2.

By this, displacement of the thick beam portion 2 can be supressed by the stopper portion 1 at the position in the vicinity of a center of gravity of the thick beam portion 2 when the thick beam portion 2 is displaced on receiving acceleration.

On the other hand, in the acceleration sensor as shown in FIG. 6, a piezo resistance device 7 is also provided on the upper side stopper portion 1.

Thus, the measurement of an absolute value of excessive acceleration can be carried out utilizing the piezo resistance device 7.

In this embodiment, the configuration of the grooved portion 103 is not restricted to a certain special configuration.

Any configuration which can attenuate the thickness of a part of the thick beam portion 2 to some extent, e.g., a semi-spherical configuration, a reverse trapezoid configuration, a reverse trapezoid configuration having a step like portion on the bottom surface thereof, and a reverse trapezoid configuration having a projecting portion on the bottom surface thereof, may also be used.

Especially, the attenuating portion of the thick beam portion 2 may be formed only by a step-like portion.

Further, it may also have a projecting portion 2a in the step-like portion as shown in FIG. 6.

One of the technical features of the present invention is that at least an upper side stopper 1 is formed by the same component as that of the thin beam portion 3 and further is provided on the same plane as the thin beam portion but separate from that.

Moreover, the stopper portion of the invention is arranged just above the attenuated portion of the thick beam portion 2 with a predetermined distance interposed between the bottom surface of the stopper portion 1 and a bottom surface of a grooved portion or a top surface of the projecting portion formed in the attenuated portion.

EXAMPLE 2

A cantilever beam type acceleration sensor has an imbalance in weight of the beam portion which is as an acceleration detecting portion of the acceleration sensor when the thin beam portion 3 is formed very thin, it will sometimes become twisted as shown in FIG. 2B, when, for example, acceleration acts on the beam portion in a lateral direction.

Figure 7:
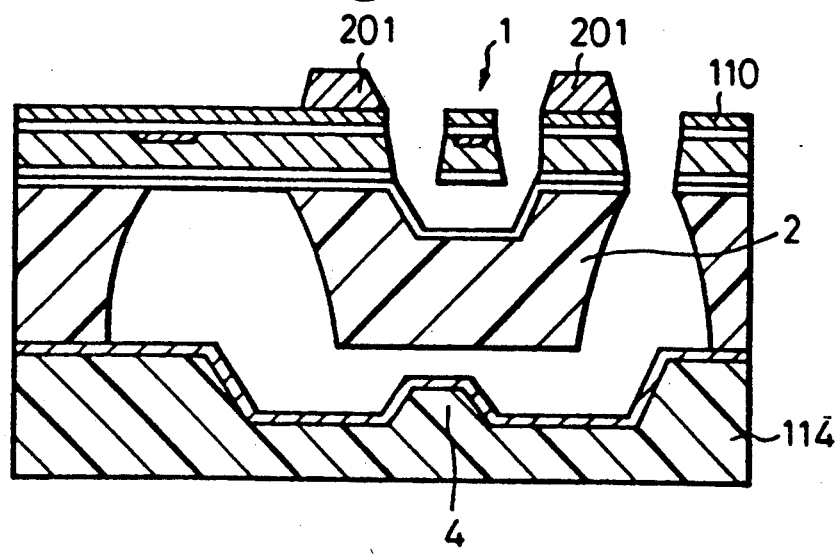
FIG. 7 is a cross-sectional view of a second embodiment of the present invention.

Therefore, in this embodiment, weights 201 are additionally provided on portions on the surface of the beam portion as shown in FIG. 7.

The weights 201 provided in the vicinity of the grooved portion can compensate for the imbalance in the weight of the beam portion to prevent twisting.

In this embodiment, a weight 201 made of metal, for example, gold, was formed on the surface of the P-SiN film by the deposition method after the P-SiN film was formed in the step shown in FIG. 3G.

In this embodiment, the rest of the components of the sensor are the same as used in the sensor shown in FIG. 2.

EXAMPLE 3

In order to improve the performance of the stopper of the upper side stopper portion 1 in Examples 1 and 2 to stop the upward displacement of the thick beam portion 2, a reinforcing portion 301 may be formed on the upper side stopper portion 1.

It may be formed simultaneously when the weight 201 is formed in the step as shown in FIG. 3G in the second embodiment, for example.

Figure 8A:
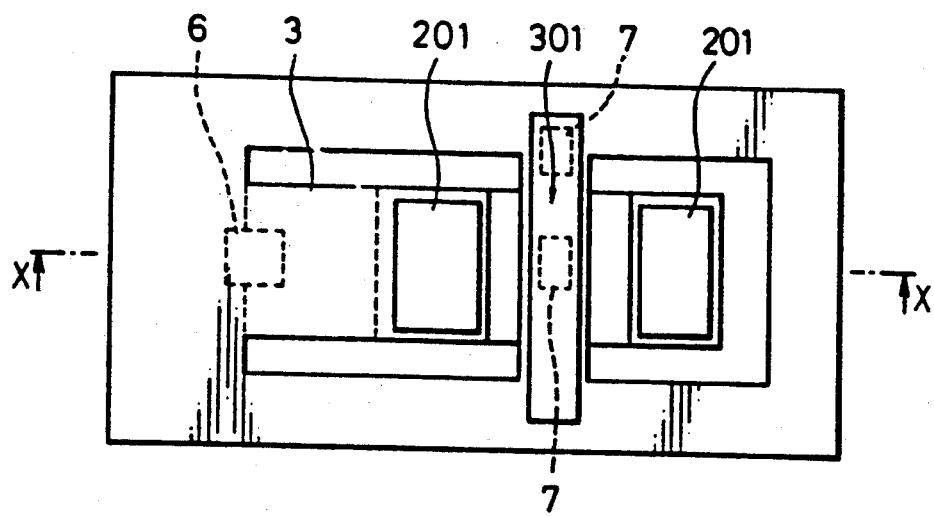
FIG. 8A is a plane view of a third embodiment of a sensor of the present invention.
Figure 8B:
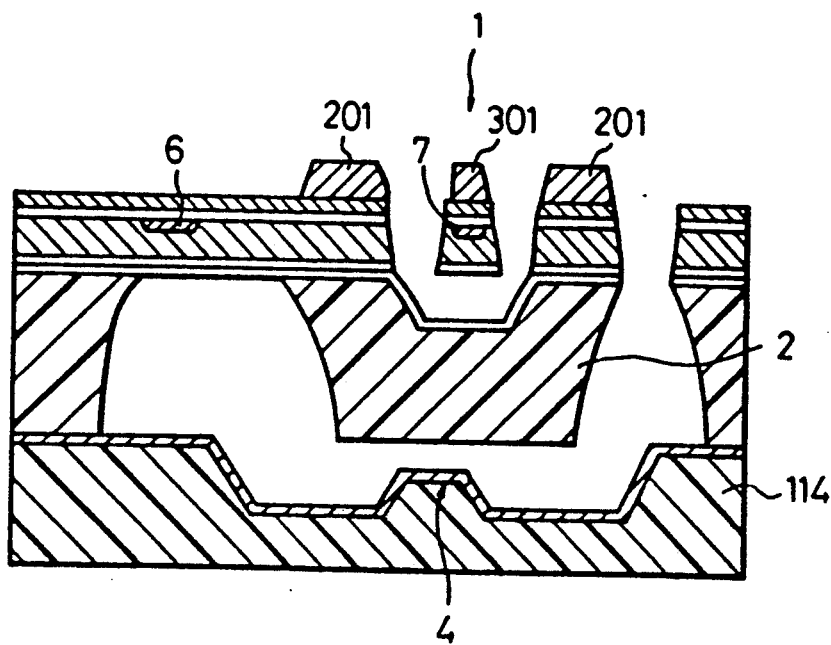
FIG. 8B is a cross-sectional view of the sensor shown in FIG. 8A taken along the line X—X.

Note that FIGS. 8A and 8B are a plane view and a cross-sectional view taken along line X—X in the plane view of the acceleration sensor, respectively, and the acceleration sensor 2 produced in the second embodiment is provided with a reinforcing portion 301.

Figure 9:
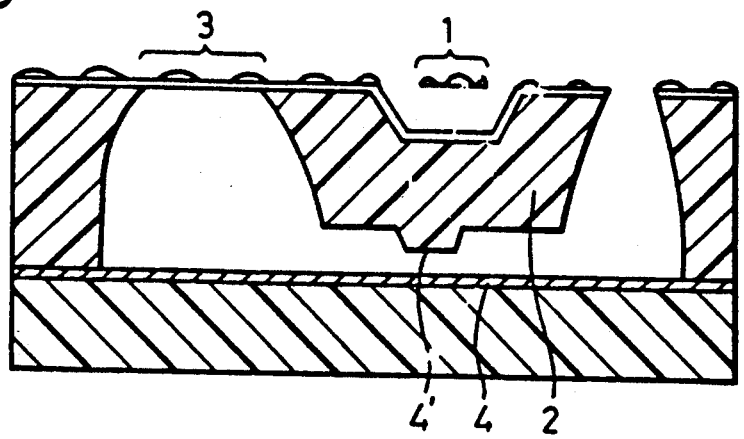
FIG. 9 is another embodiment of a lower stopper of the sensor of the present invention.

In aforementioned embodiments, a lower side stopper portion 4 is formed on an inside surface of a base supporting portion 114, which is one of the main solid members of the embodiments, but a projecting portion 4' may be formed in a bottom surface of the thick beam portion 2 opposite to the lower side stopping portion, as shown in FIG. 9.

EXAMPLE 4

Figure 10A:
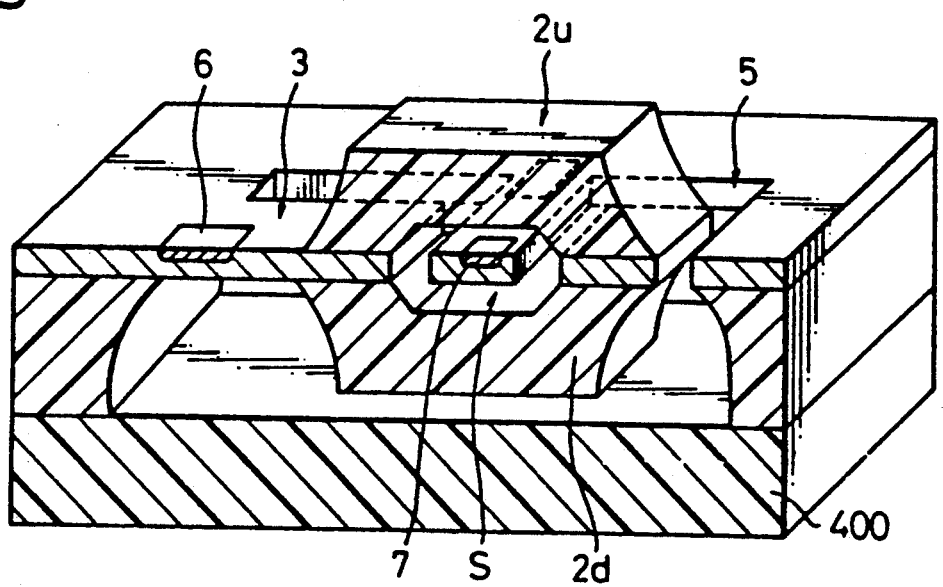
FIG. 10A is a perspective view of a fourth embodiment of a sensor of the present invention.
Figure 10B:
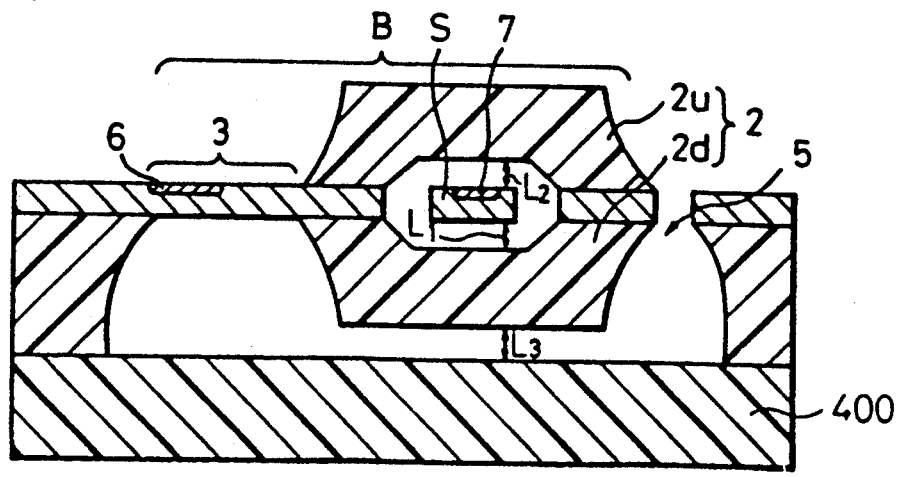
FIG. 10B is a cross-sectional view of the sensor shown in FIG. 10A.

FIG. 10A is a perspective view of a fourth embodiment of a semiconductor sensor for an accelerometer of the present invention, and FIG. 10B is a cross-sectional view thereof.

In FIG. 10, S denotes a stopper portion for stopping an upward or a downward displacement of the beam portion B, i.e., an acceleration detecting portion, while 2u, 2d, and 400 denotes an upper side portion of the thick beam portion 2, a lower side portion of the thick beam portion 2, and a supporting member, respectively.

The rest of elements having the same construction as used in FIG. 2 are given the same reference symbols as used in FIG. 2.

Note that, in this embodiment, a gap distance $L_1$ between the stopper S and the lower side of the thick beam portion 2d and a gap distance $L_2$ between the stopper S and the upper side of the thick beam portion 2u are the same, and both the upper side portion of the thick beam portion 2u and lower side portion of the thick beam portion 2d are formed in the same configuration and made of the same materials.

Accordingly, the stopper S is positioned at the center of gravity of the thick beam portion 2, the upward displacement of the beam portion B or the downward displacement thereof can be effectively stopped by the stopper S which receives movement of the center of gravity of the beam portion.

Namely, in this embodiment, the breakage of the beam portion B frequently occurring at thin beam portion 3 can be avoided.

Further, a piezo resistance device 7 is also provided on the stopper portion S in the same way as shown in the first embodiment, therefore an absolute value of excessive acceleration can be detected.

In this embodiment, since the thick beam portion 2 is formed symmetrical with respect to a plane along which the thin beam portion 3 is arranged, both upward and downward displacement of the thick beam portion 2 can be uniformly detected.

Due to the thick beam portion 2 having such a symmetrical configuration, the weight imbalance of the beam portion B as explained above can be accurately compensated and thus twisting of the beam portion B can be suppressed.

In this embodiment, a gap distance $L_3$ formed between the bottom surface of the lower side portion of the thick beam portion 2d and a surface of the supporting member 400 may be set at a sufficient length so that the bottom surface of the lower side portion of the thick beam portion 2d does not contact the surface of the supporting member 400 when the beam 3 is displaced downwardly.

Hereafter, one embodiment of a method for producing an acceleration sensor shown in this example will be explained with reference to FIG. 11.

Figure 11A:
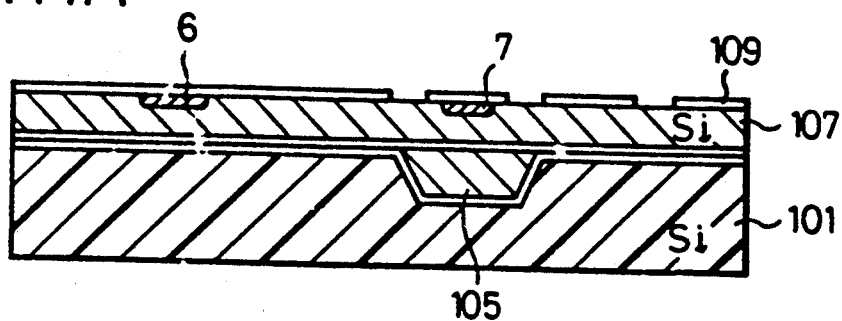
FIGS. 11A to 11E are cross-sectional views of the fourth embodiment of the sensor at steps in the production process.

First, after the same production steps as used in the first embodiment shown in FIGS. 3A to 3F, a predetermined pattern is etched on a $SiO_2$ film 109 formed on one surface of the substrate 107 utilizing a conventional photo-etching method, as shown in FIG. 11A.

Figure 11B:
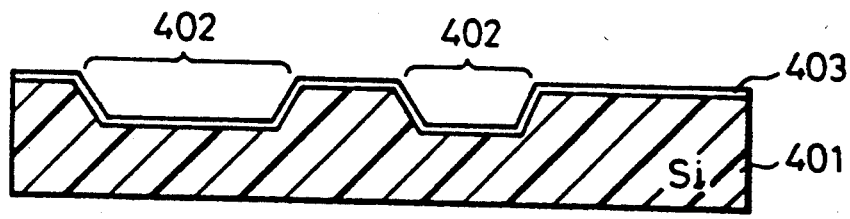

On the other hand, as shown in FIG. 11B, another Si substrate 401 is prepared and grooved portions 402 each having a predetermined configuration are formed on one main surface thereof, thereafter an $SiO_2$ film 403 is formed on entire surface of the substrate thus treated with a thermal oxidation method.

Figure 11C:
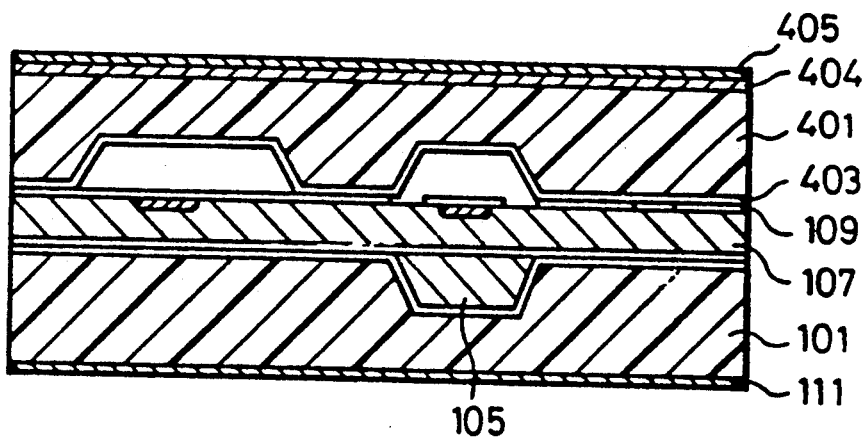

Then, after forming a glass film having a low melting point (not shown) having a thickness of 0.5 to 5 μm on the surface of the $SiO_2$ film 403 formed on the Si substrate 401, the substrates shown in FIG. 11A and FIG. 11B are bonded to each other with the low-melting point glass film interposing at a temperature of 450° to 500° C., as shown in FIG. 11C.

Successively, a P-SiN film 404, and Cr deposition films 405 and 111 are formed, as shown in FIG. 11C.

Figure 11D:
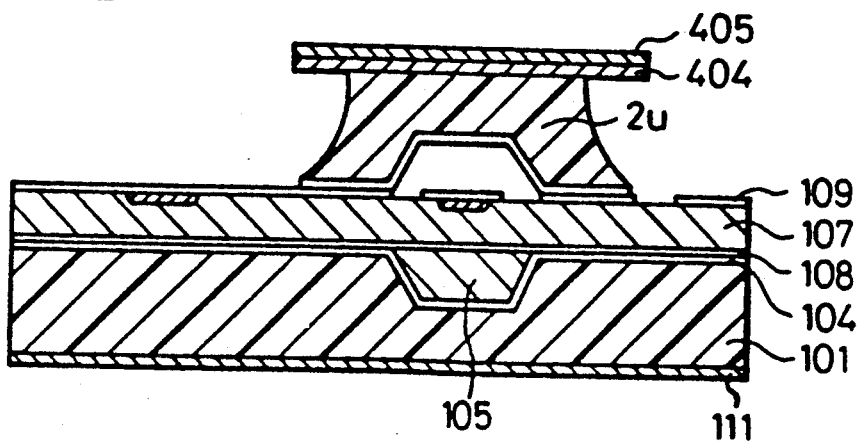

After predetermined patterns are formed in the P-SiN film 404 and the Cr deposition films 405 respectively, the substrate 401 is etched with an isotropic etchant such as fluoric nitric, acetic acid utilizing the pattern thus formed as a mask to form an upper side portion of the thick beam portion 2u, as shown in FIG. 11D.

Successively, the same manner as shown FIG. 3H, the Si layer 107, and $SiO_2$ films 108 and 104 are etched, and then the poly Si layer 105 is removed by an etching operation to form a stopper portion S, as shown in FIG. 10.

Further, in the same manner as shown FIG. 3I, a Cr deposition film 111 formed on a back surface of the substrate 101 is etched to form a predetermined pattern and further an etching operation is carried out to etch the substrate 101 from the back surface thereof, utilizing the patterned Cr deposition film 111 as a mask.

Figure 11E:
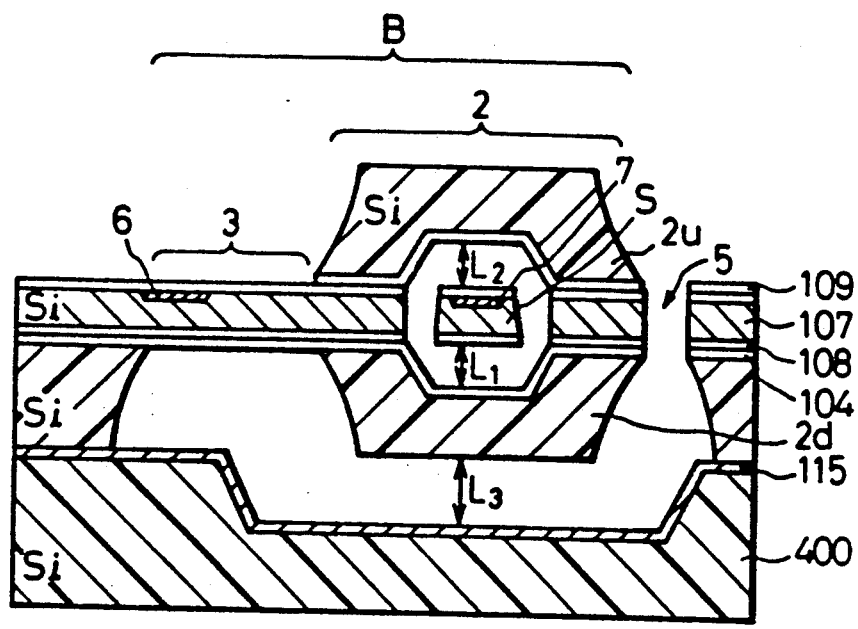

Through these production steps, the slit 5, a lower side portion of the thick beam portion 2d, and a thin beam portion 3 are formed integrally in the composite substrate. Then, the thus constructed body is bonded with a Si substrate 400 as a supporting member having a Pyrex glass layer 115 formed on a surface thereof, utilizing an anodic bonding method with the Pyrex glass layer 115 interposed therebetween as shown in FIG. 11E.

According to the steps as explained above, a semiconductor sensor for an accelerometer of the fourth embodiment integrally formed in an Si substrate can be produced.

In this embodiment, the gap distance $L_1$ and $L_2$ which control a displacement of the thick beam portion 2 are determined by the thickness of the poly Si layer 105 and depth of the grooved portion 402 provided in the substrate 401, respectively.

In this embodiment, the substrates 101 and 104 are bonded to each other by a glass bonding method, although they may be bonded by a conventional direct bonding method.

Further, even in this embodiment, the technical concept as shown in the third embodiment can be applied.

Note that in the step as shown in FIG. 11A, a reinforcing portion may be formed on a surface of the SiO$_2$ film 109 provided just upon the poly Si layer 105 by a deposition method or the like, Whereby the stopping performance of the stopper S can be increased.

In these embodiments above, an Si substrate 114 or 400 is used as a supporting member and bonded to the substrate in which the beam portion B is already formed by an anodic bonding method, but for example, a glass bonding method utilizing glass having a low melting point or a direct bonding method utilizing an Si—Si bond, may be used.

Further, a Pyrex substrate having a thermal expansion coefficient substantially equal to that of Si may be used instead of using the Si substrate.

In these embodiments, in order to detect acceleration with a high sensitivity, the thin beam portion 3 is generally thinned, but when the temperature changes in the detecting operation, the thin beam portion 3 is deformed due to the bimetal effect caused by the difference between thermal expansion coefficients of the thin beam portion 3 and an insulating film or Al wiring layer formed on a surface of the thin beam portion 3, reducing the detected output thereof.

Accordingly, in this embodiment, the SiO$_2$ films 104, 108, and 109 and P-SiN film 110 may be removed to expose the N-type Si layer 107 to the air.

Figure 12:
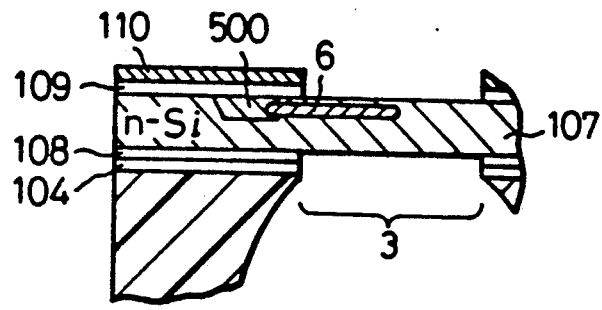
FIG. 12 is a partial cross-sectional view of embodiment of a piezo resistance device.

In this situation, when the P-type piezo resistance device 6 is formed inside of the N-type Si layer 107 as shown in FIG. 12, the insuating layer 109 can be removed easily.

Further, in this embodiment, an N-type impurity, for example, P or As, can be injected into the Si layer 107 by an ion implantation method or the like to form a concrete PN junction in the Si layer 107.

In FIG. 12, an electrical contact to the piezo resistance device 6 can be realized by a P+ layer 500 formed on a surface of the Si substrate 109.

The P-type piezo resistance device 6 and the P+ layer 500 may be formed in the step shown in FIG. 3F after that, the insulating film may be removed at the time when the stopper and the thick beam portion are formed to expose the Si layer 107 to the air.

Figure 13A:
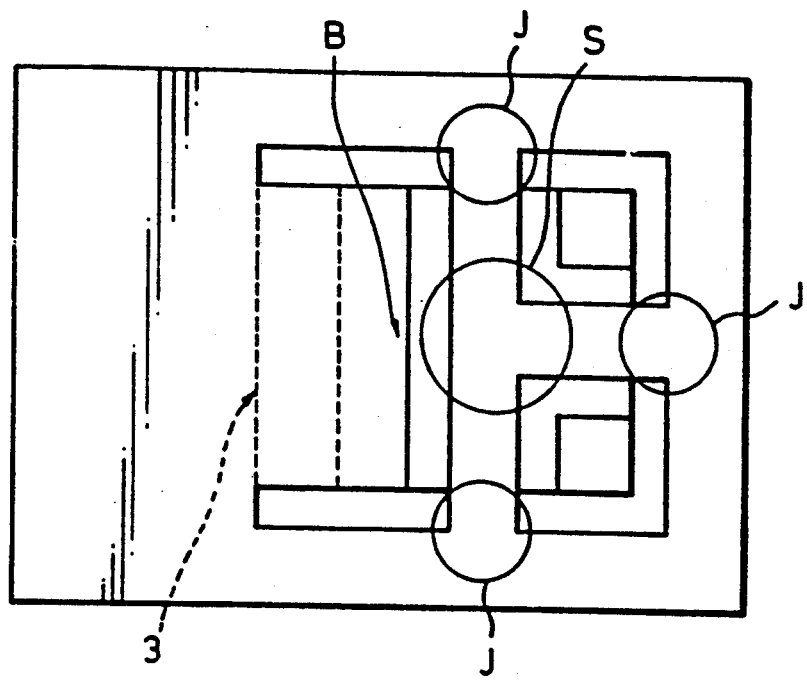
FIGS. 13A and 13B are plane views illustrating a contacting portion of a stopper.
Figure 13B:
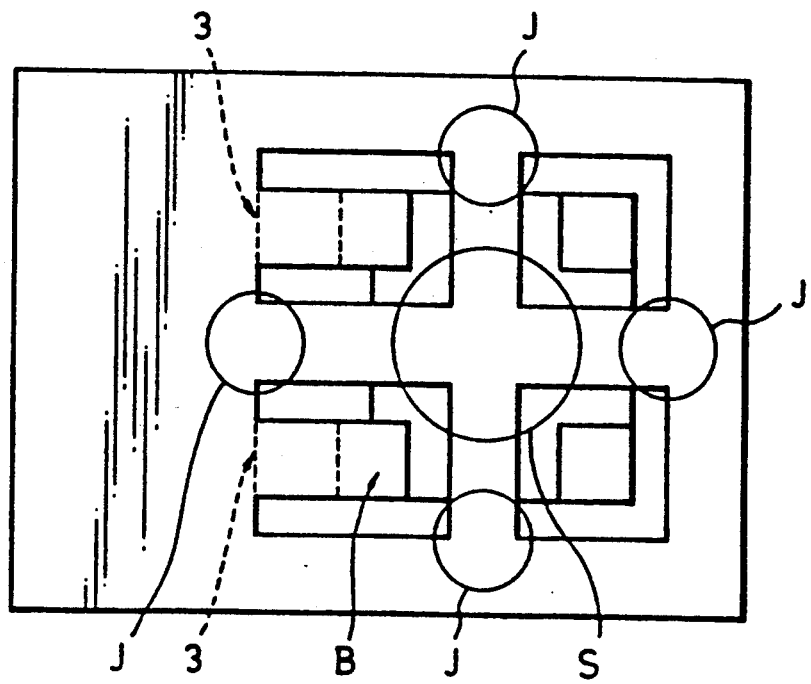

In the previous embodiments especially shown in FIGS. 2, 8, and 10, the stopper portion S is supported by the circumferencial substrate thereof through both ends, although it may be supported the substrate in three directions or four directions of the stopper portion as shown, for example, in FIGS. 13A and 13B.

Note that, in FIG. 13, S, J, and B denote a stopper portion, a contacting portion between the stopper portion S and the circumferencial substrate, and a beam portion as a sensing portion, respectively.

In this embodiment, when the stopper portion is supported by the circumferential substrate through a plurality of multidirectional edges, the strength of the stopper is improved and a large amount of the displacement of the beam portion caused by excessive acceleration can be effectively suppressed.

Further, in these embodiments a cantilever type beam portion is used as an acceleration sensing portion, but a beam portion with both ends supported by the circumferential substrate may be used, moreover, a beam portion having a cross configuration having four separate edges may be used as the acceleration sensing device, in which all of the four edges are supported by the circumferential substrate.

This invention can be applied to beam construction different from that as explained above.

EXAMPLE 5

In these embodiments, in order to position the upper side stopper 1 or stopper S and cooperate with the stopper, a grooved portion 103 is first formed on the surface of the substrate 101 as shown in FIG. 3A and then a poly Si layer 105 is filled into the grooved portion 103 so as to be embedded inside the substrate as shown in FIG. 3e and FIG. 11A.

Figure 14A:
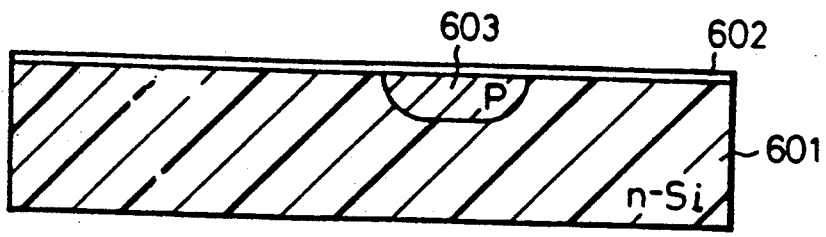
FIGS. 14A to 14E are cross-sectional views of the sensor on respective step in another production process.

This construction may be produced by the following method;

As shown in FIG. 14A, a SiO$_2$ film 602 having a thickness of 0.1 to 10 $\mu$m is formed on a surface of an N-type Si substrate 601 having a (100) phase direction and a resistivity of 3 to 5 $\Omega$·cm by a thermal oxidation method. After that, a P-type diffusing portion 603 is formed in a predetermined area of the substrate by implanting boron utilizing an ion implantation method.

Figure 14B:
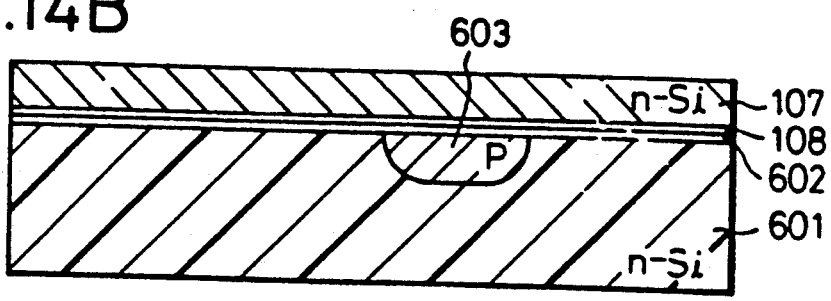

Then, in the same manner as shown FIG. 3D, the substrate 106 as shown in FIG. 3D and another Si substrate 601, with an N-type Si layer 107 having a (100) phase direction epitaxially grown on the surface thereof through SiO$_2$ films 108 and 602, are bonded each other by a direct bonding method. Thereafter, the Si substrate 106 bonded to the substrate 601 is removed leaving the N-type Si layer 107 by an electrolytic etching method as shown in FIG. 14B. Thereafter, in the same manner as shown in FIG. 3F, first, an SiO$_2$ film 109 is formed and successively P-type piezo resistance devices 6 and 7 are formed in a predetermined region. Finally, an IC circuit and Al wiring (not shown) are formed.

Figure 14C:
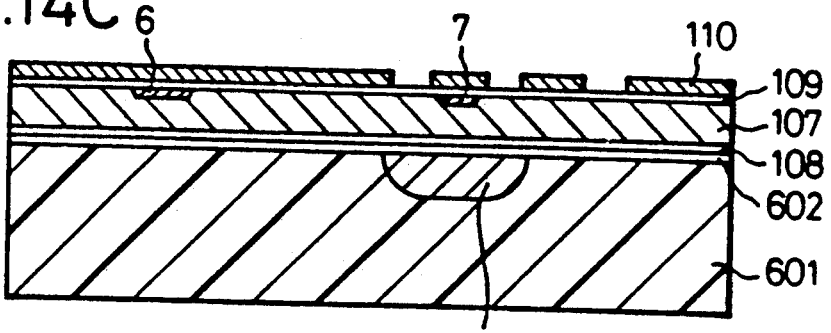

As shown in FIG. 14C, a P-SiN film 110 having a predetermined pattern is formed on the surface of the SiO$_2$ film 109.

Figure 14D:
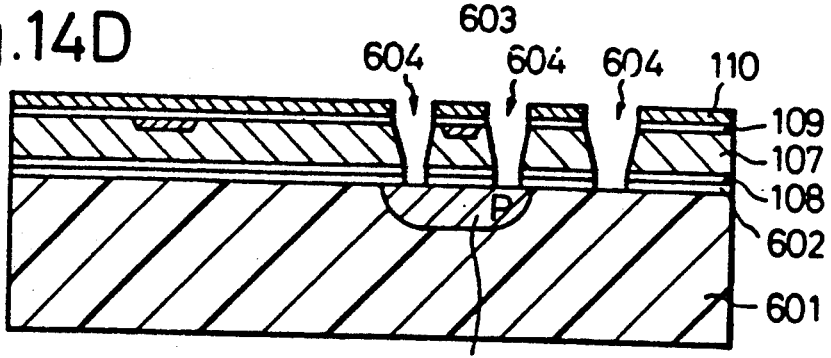
Figure 14E:
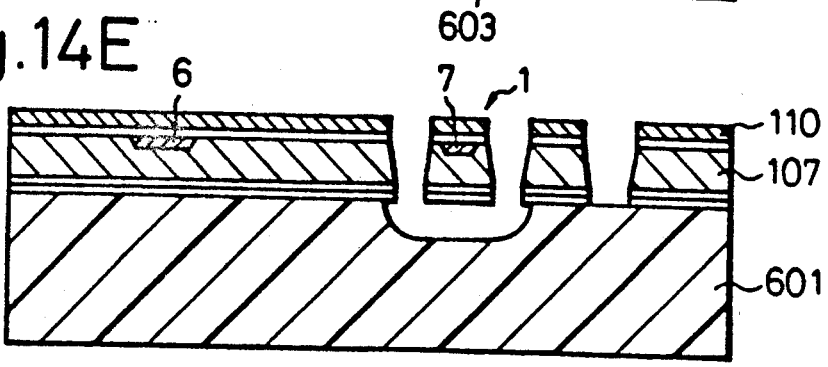

Moreover, the Si layer 107 is etched by an anisotropic etching method utilizing an alkaline etchant such as KOH, then SiO films 108 and 602 are removed by an etching method utilizing an etchant, including fluoride (HF), to form a grooved portion 604 as shown in FIG. 14D.

Next, for example, the substrate thus processed is immersed into an etching bath containing an alkaline etchant utilizing the Al wiring formed in the step as shown in FIG. 14C as an anode.

As the anode in this situation, a metallic electrode simply attached thereto may be used. As the opposite electrode, a platinum cathode is immersed in the same etching bath.

In this situation, when a voltage of about 0.7 to 3 V is applied between the two electrodes, only the P-type diffusion layer 603 is removed by the etching operation to form an upper side stopper portion 1 as shown in FIG. 14C.

Note, that this phenomenon was disclosed, for example, in IEEE ELECTRON DEVICE LETTERS, Vol. EDL-2, No 2, February 1981, 44 to 45.

Following this process, the steps as shown in FIGS. 3I and 3J are applied to this embodiment to make the semiconductor sensor for an accelerometer having the same construction as shown in FIG. 2.

Note that the gap distance $l_1$ in this embodiment may be determined by the depth of the P-type diffusion layer 603.

In these embodiments, the poly Si layer 105 or P-type diffusing layer 603 is formed only one of the substrates to be bonded, but it may be formed on in both substrates.

Further, in accordance with these embodiments, an acceleration sensor can be produced utilizing the poly Si layer 105 and P-type diffusing layer 603 without forming a space in which contaminated particles, dust, chemical substances are easily deposited, in the substrate, although in the first embodiment, an acceleration sensor may be produced with the substrate 101 with a grooved portion 103 but without filling the poly Si layer therein.

We claim:

1. A semiconductor sensor for an accelerometer, comprising:
    a solid member;
    a beam portion, formed by a thin beam portion and a thick beam portion connected to each other and supported on said solid member by at least one end of said thin beam portion, said thin beam portion serving as a stress generating region;
    said thick beam portion integrally extending from another end of said thin beam portion, serving as a load receiving region, said thick beam portion being provided with at least one grooved portion on at least one main surface thereof to form a partially thin portion;
    a semiconductor strain sensing device formed on said thin beam portion and detecting a strain value generated in said thin beam portion in response to acceleration applied to said thin beam portion; and
    at least one stopper provided on a same plane as a plane of said thin beam portion, said stopper having a first portion which is separated from said thin beam portion and is arranged adjacent a center of gravity of said thick beam portion to restrict a range of displacement of said thick beam portion, and arranged in a direction so that a longitudinal axis of said first portion is perpendicular to a direction in which said thick beam portion is integrally extended, so that said stopper crosses over said thick beam portion; and said stopper also having second portions provided on both ends of said stopper and connected to a portion of said solid member, said second portions being provided on the same plane as the plane of said thin beam portion, so that both end portions of said first portion of said stopper are fixedly supported on said solid member with said second portions, to thereby restrict the range of displacement of said thick beam portion.

2. A semiconductor sensor for an accelerometer according to claim 1, further comprising another semiconductor strain sensing device provided on said stopper.

3. A semiconductor sensor for an accelerometer according to claim 1, wherein at least two of said thick beam portions are symmetrically formed on the two surfaces of a plane in which said thin beam portion is formed and said stopper is provided inside a hollow portion provided inside said symmetrically formed thick beam portion.

4. A semiconductor sensor for an accelerometer according to claim 1, wherein another stopper is provided on a bottom surface of said solid member opposite to another main surface of said thick beam portion.

5. A sensor as in claim 1, wherein said second portions are integral to said thin beam portion.

6. A semiconductor sensor for an accelerometer, comprising:
    a solid member;
    a beam portion, formed by a thin beam portion and a thick beam portion connected to each other and supported on said solid member by at least one end of said thin beam portion;
    said thin portion serving as a stress generating region;
    said thick portion integrally extending from another end of said thin beam portion, serving as a load receiving region, and provided with either a grooved portion or a projected portion on at least one main surface thereof;
    a semiconductor strain sensing device formed on said thin beam portion and detecting a strain value generated in said thin beam portion in response to acceleration applied to said thick beam portion; and
    at least one stopper provided on the same plane as said thin beam portion, having a first portion which is separated from said thin beam portion and is arranged adjacent a center of gravity of said thick beam portion to restrict a range of displacement of said thick beam portion, and arranged in a direction so that a longitudinal axis of said first portion is perpendicular to a direction in which said thick beam portion is integrally extended, so that said stopper crosses over said thick beam portion; and said stopper also having second portions provided on both ends of said stopper and connected to a portion of said solid member, said second portions being provided on the same plane as the plane of said thin beam portion, so that both end portions of said first portion of said stopper are fixedly supported on said solid member with said second portions, to thereby restrict the range of displacement of said thick beam portion;
    said stopper contacting a surface of said grooved portion or said projected portion during acceleration, to prevent further movement of said thick beam portion, and a direction of said stopper between said first and second portions being substantially perpendicular to an imaginary moving line of a center of gravity of said thick beam portion.

7. A semiconductor sensor for an accelerometer according to claim 6, further comprising another semiconductor strain sensing device provided on said stopper.

8. A semiconductor sensor for an accelerometer according to claim 6, wherein at least two of said thick beam portions are symmetrically formed on the two surfaces of a plane in which said thin beam portion is formed and said stopper is provided inside a hollow portion provided inside said symmetrically formed thick beam portion.

9. A sensor as in claim 6, wherein said second portions are integral to said thin beam portion.

10. A semiconductor sensor for an accelerometer, comprising:

a solid member;

a beam portion, formed by a thin beam portion and a thick beam portion connected to each other and supported on said solid member by at least one end of said thin beam portion;

said thin beam portion serving as a stress generating region;

said thick beam portion integrally extending from another end of said thin beam portion, serving as a load receiving region, said thick beam portion including at least one grooved portion at a center portion thereof and on one surface thereof, formed in the same plane in which a main surface of said thin beam portion is formed, a longitudinal direction thereof being perpendicular to a direction along which said thick beam portion is extended from said thin beam portion;

a semiconductor stain sensing device formed on said thin beam portion and detecting a strain value generated in said thin beam portion in response to an acceleration applied to said thick beam portion; and at least one stopper provided in the vicinity of said main surface of said thick beam portion, at least a root portion of said stopper being connected to said thin beam portion to restrict a range of displacement of said thick beam portion, said stopper being in a same plane as said thin beam portion but separated from said thin beam portion, having a first portion which is separated from said thin beam portion and is arranged adjacent a center of gravity of said thick beam portion to restrict a range of displacement of said thick beam portion, and arranged in a direction so that a longitudinal axis of said first portion is perpendicular to a direction in which said thick beam portion is integrally extended, so that said stopper crosses over said thick beam portion; and said stopper also having second portions provided on both ends of said stopper and connected to a portion of said solid member, said second portions being provided on the same plane as the plane of said thin beam portion, so that both end portions of said first portion of said stopper are fixedly supported on said solid member with said second portions, to thereby restrict the range of displacement of said thick beam portion, said stopper contacting a surface of said grooved portion to prevent further movement of said thick beam portion, at least a root portion and a direction of said stopper between said first and second portions being substantially perpendicular to an imaginary moving line of a center of gravity of said thick beam portion.

11. A semiconductor sensor for an accelerometer according to claim 10, further comprising another semiconductor strain sensing device provided on said stopper.

12. A semiconductor sensor for an accelerometer according to claim 10, wherein at least two of said thick beam portions are symmetrically formed on the two surfaces of a plane in which said thin beam portion is formed and said stopper is provided inside a hollow portion provided inside said symmetrically formed thick beam portion.

13. A semiconductor sensor for an accelerometer, comprising:

a solid member;

a beam portion, formed by a thin beam portion and a thick beam portion connected to each other and supported on said solid member by at least one end of said thin beam portion, said thin beam portion serving as a stress generating region, said thick beam portion integrally extending from another end of said thin beam portion, serving as a load receiving region, said thick beam portion being provided with at least one grooved portion on at least one main surface thereof where said thick beam portion is partially thin;

a semiconductor strain sensing device formed on said thin beam portion and detecting a strain value generated in said thin beam portion in response to acceleration applied to said thin beam portion;

at least one stopper provided on a same plane as a plane of said thin beam portion but separate from said thin beam portion to restrict a range of displacement of said thick beam portion; by contacting said grooved portion; and another semiconductor strain sensing device provided on said stopper and detecting a strain value generated in said thin beam portion in response to acceleration applied to said thin beam portion.

14. A semiconductor sensor for an accelerometer, comprising:

a solid member;

a beam portion, formed by a thin beam portion and a thick beam portion connected to each other and supported on said solid member by at least one end of said thin beam portion;

said thin beam portion serving as a stress generating region;

said thick beam portion integrally extending from another end of said thin beam portion, serving as a load receiving region, and provided with either a grooved portion or a projected portion on at least one main surface thereof;

a semiconductor strain sensing device formed on said thin beam portion and detecting a strain value generated in said thin beam portion in response to acceleration applied to said thick beam portion;

at least one stopper provided on the same plane as said thin beam portion and separated from said thin beam portion to restrict a range of displacement of said thick beam portion, said stopper portion contacting a surface of said grooved portion or said projected portion during acceleration, to prevent further movement of said thick beam portion; and another semiconductor strain sensing device provided on said stopper.

15. A semiconductor sensor for an accelerometer, comprising:

a solid member;

a beam portion formed by a thin beam portion and a thick beam portion connected to each other and supported on said solid member by at least one end of said thin beam portion;

said thin beam portion serving as a stress generating region;

said thick beam portion integrally extending from another end of said thin beam portion, serving as a load receiving region, said thick beam portion including at least one grooved portion at a center portion thereof and on one surface thereof, formed in the same plane in which a main surface of said thin beam portion is formed, a longitudinal direction thereof being perpendicular to a direction along which said thick beam portion is extended from said thin beam portion;

a semiconductor strain sensing device formed on said thin beam portion and detecting a strain value generated in said thin beam portion in response to an acceleration applied to said thick beam portion;

at least one stopper provided in the vicinity of said main surface of said thick beam portion, to restrict a range of displacement of said thick beam portion, said stopper being in a same plane as said thin beam portion but separated from said thin beam portion and at least a root portion of said stopper being connected to said thin beam portion, said stopper contacting a surface of said grooved portion during acceleration, to prevent further movement of said thick beam portion; and another semiconductor strain sensing device provided on said stopper.

* * * * *